US010282406B2

(12) United States Patent
Bissantz (10) Patent No.: US 10,282,406 B2
(45) Date of Patent: May 7, 2019

(54) SYSTEM FOR MODIFYING A TABLE (71) Applicant: Nicolas Bissantz, Nürnberg (DE)

(72) Inventor: Nicolas Bissantz, Nürnberg (DE)

( * ) Notice: Subject to any disclaimer, the term of this patent is extended or adjusted under 35 U.S.C. 154(b) by 389 days.

(21) Appl. No.: 14/068,209

(22) Filed: Oct. 31, 2013

(65) Prior Publication Data

US 2015/0121188 A1 Apr. 30, 2015

(51) Int. Cl.
G06F 17/00 (2019.01)
G06F 17/24 (2006.01)
G06F 17/21 (2006.01)

(52) U.S. Cl.
CPC .......... *G06F 17/245* (2013.01); *G06F 17/211* (2013.01); *G06F 17/246* (2013.01)

(58) Field of Classification Search
CPC ..... G06F 17/246; G06F 17/245; G06F 17/211
See application file for complete search history.

(56) References Cited

U.S. PATENT DOCUMENTS

| 7,082,569 | B2* | 7/2006 | Voshell | G06F 17/246 |
| | | | | 715/212 |
| 7,925,989 | B2* | 4/2011 | Hofmann | G06F 17/212 |
| | | | | 715/793 |
| 8,275,974 | B2* | 9/2012 | Voshell | G06F 16/2423 |
| | | | | 712/212 |
| 9,183,561 | B2* | 11/2015 | Hanumara | G06Q 30/02 |
| 2002/0116417 | A1* | 8/2002 | Weinberg | G06F 17/243 |
| | | | | 715/212 |
| 2004/0194009 | A1* | 9/2004 | LaComb | G06F 17/211 |
| | | | | 715/239 |
| 2006/0107196 | A1* | 5/2006 | Thanu | G06F 17/246 |
| | | | | 715/217 |
| 2007/0130503 | A1* | 6/2007 | Voshell | G06F 16/2423 |
| | | | | 715/212 |
| 2008/0243763 | A1* | 10/2008 | Bishop | G06F 17/246 |
| 2011/0032555 | A1* | 2/2011 | Mizutani | G06F 3/1208 |
| | | | | 358/1.9 |

OTHER PUBLICATIONS

Gregory, Redo and Repeat Commands in Excel [Updated], Jan. 7, 2011 http://excelsemipro.com/2011/01/redo-and-repeat-commands-in-excel/.*

(Continued)

*Primary Examiner* — Cesar B Paula
*Assistant Examiner* — David Faber
(74) *Attorney, Agent, or Firm* — Dilworth & Barrese, LLP.; Michael J. Musella, Esq.

(57) ABSTRACT

The present invention relates to a system for modifying a table comprising generating means for generating a table, wherein the table contains one or more columns and one or more lines containing data, wherein the columns and the lines are related to one or more first categories, respectively, and wherein at least one of said first categories is divided into one or more sub-categories, wherein the system further comprises changing means for changing the distance between data related to two neighboring first categories and/or for changing the distance between data related to two neighboring sub-categories and/or for changing the line height and/or the column width, wherein the changing means are adapted to increase and/or decrease said distance and/or line height and/or the column width in order to increase legibility of the table.

19 Claims, 5 Drawing Sheets

(56) References Cited

OTHER PUBLICATIONS

Diane Koers, Excel 2007 Just the Steps for Dummies, Feb. 2007, "How to Change Column Width and Row Height in Excel 2007" http://www.dummies.com/how-to/content/how-to-change-column-width-and-row-height-in-excel.html.*

Diane Koers, "Excel 2007 Just the Steps for Dummies", copyrighted 2007, p. 1-234 + Introduction and Table of Contents (241 pages total).*

Dodge et al, "Microsoft Office Excel 2007 Inside Out", Jan. 17, 2007 p. 172-179, 226-231, 298-303.*

Microsoft, "Microsoft Excel 2013", Microsoft, , SS0-SS31 + 22 pages; 54 pages overall.*

Pachal, Pete, Office 2013 Is a Big Improvement, but Needs Polish [REVIEW], Jan. 29, 2013 Mashable.com, 11 pages. (Used to disclose Microsoft Office/Excel 2013 was released to the public on Jan. 29, 2013).*

* cited by examiner

SYSTEM FOR MODIFYING A TABLE

BACKGROUND OF THE INVENTION

The present invention relates to a system for modifying a table, wherein the table contains one or more columns and one or more lines containing data, wherein the columns and the lines are related to one or more first categories, respectively, and wherein at least one of said first categories is divided into one or more sub-categories.

Figure 1:
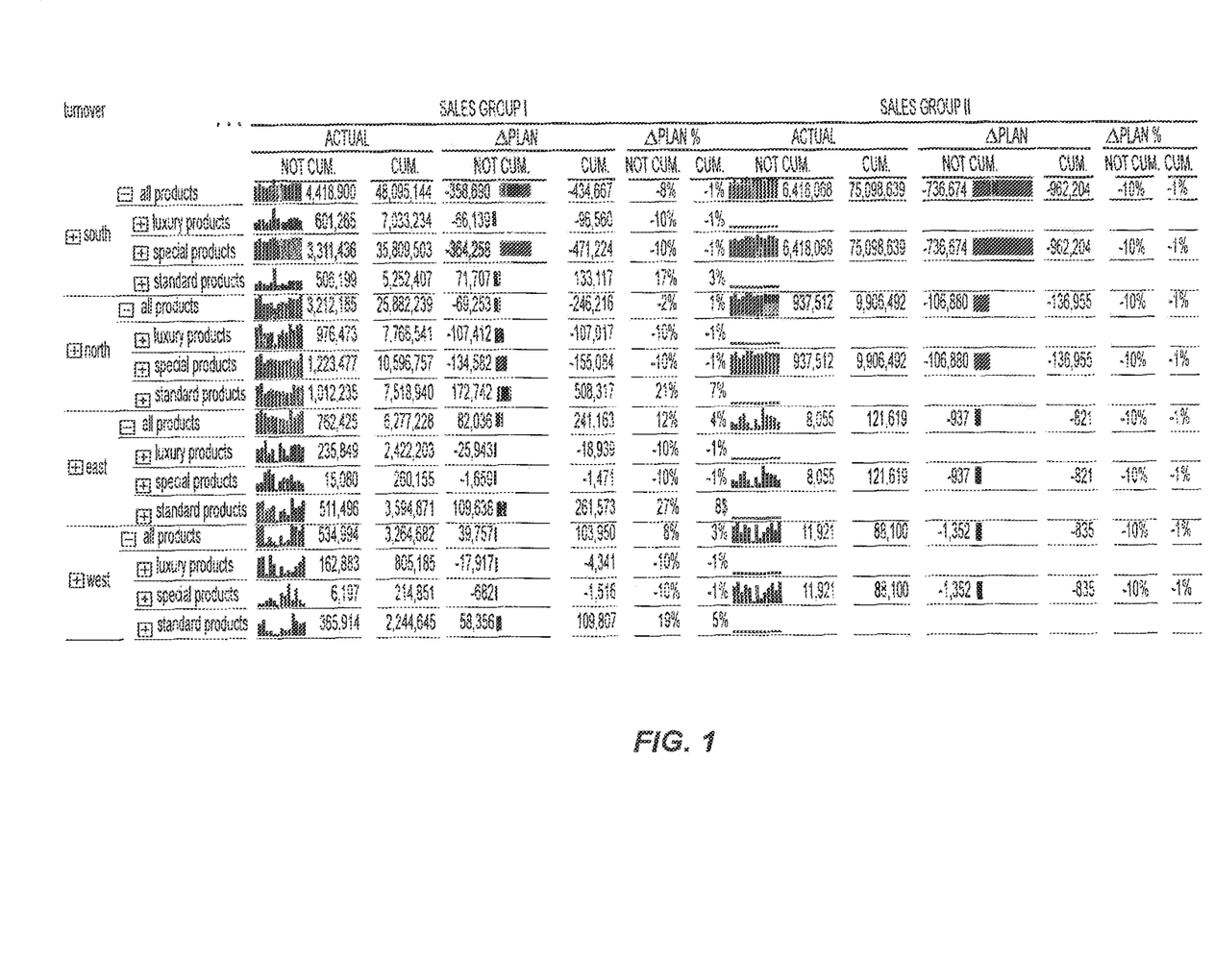
FIG. 1 illustrates a table containing one or more columns and one or more lines containing data.

An example of such table is shown in FIG. 1, the data of which are turnover numbers obtained with certain products. As outlined in FIG. 1 the table comprises a number of columns as well as a number of lines. In the example shown in FIG. 1 the columns comprise two first categories, namely the sales personnel ("sales force I" and "sales force II") and the lines comprise four first categories, namely the sales area ("south", "north", "east", "west").

As further shown in FIG. 1 each of the first categories is sub-divided in sub-categories. The first categories ("south", "north", "east", "west") of the lines are each subdivided in four sub-categories relating to the kind of products (all products, luxury products, special products, standard products) and the first categories ("sales group I" and "sales group II") of the columns are each sub-divided in three first sub-categories, respectively, relating to the kind of values ("actual", "Aplan" and "zplan %"). Each of the first sub-categories of the columns is further sub-divided into two second sub-categories relating to the accumulation of values ("not cum." and "cum.").

The table shown in FIG. 1 thus comprises two hierarchies of the lines and three hierarchies of the columns.

The table shown in FIG. 1 contains a lot of information relating to the turnover values of certain products depending on different parameters, however, unveils the disadvantage that it might become difficult to maintain an overview and to make a quick assessment of the data contained in the table, especially in case of a high number of data. In order to increase the legibility of the table it is possible to draw lines between the lines and columns or to highlight several data.

However, this method is cumbersome. It is therefore an object of the present invention to provide a system for modifying a table which is easy to handle and which remarkably increases the legibility of the table even if a high number of data is contained in the table.

SUMMARY OF THE INVENTION

This object is solved by a system described herein. The system of the present invention comprises changing means for changing the distance between data related to two neighboring first categories and/or for changing the distance between data related to two neighboring sub-categories and/or for changing the line height and/or the column width, wherein the changing means are adapted to increase and/or decrease said distance and/or line height and/or column width in order to increase legibility of the table.

Accordingly, the present invention is based on the idea to increase and/or decrease the distance between at least two columns or lines of data and/or the line height and/or the column width which provides an arrangement of data resulting in a better overview without providing additional lines between the columns or lines and without highlighting values contained in the table.

The changing means are preferably means for separation of at least two neighboring lines or columns of data. Thus at least two neighboring lines or columns of data are separated by each other by a certain distance, which may be fixed or which may be adjustable by a user. This may take place with or without any change of the line height and/or column width.

The changing means may be adapted so as to change the distances between all lines and/or all columns or only between one or more, but not all of the lines and/or columns and/or the line height and/or the column width of all lines and/or columns or only one or more but not all of them.

In accordance with a preferred embodiment the changing means are adapted to increase and/or decrease the distance between data located in columns and/or between data located in lines. Accordingly it is possible to increase and/or decrease the distance between the columns of data, between the lines of data or between both. The same applies to the line height and/or column width.

Further, the kind of category (first category or sub-category) may be interchangeable, which means that a first category may be changed to a sub-category and/or a sub-category may be changed to a first category by a user. Preferably the system comprises means for performing this change, which means may be operated by the user.

In accordance with a preferred embodiment of the invention the system comprises means including an algorithm, wherein the algorithm is adapted to change the distance and/or the line height and/or the column width in subsequent steps or simultaneously Those subsequent steps may be triggered either automatically or by action of a user. Thus, it is conceivable that the user repeatedly presses a key on the keyboard or a button of the computer mouse etc. With each such action the changing means are activated and change one or more distances and/or one or more line heights and/or one or more column widths. The keyboard and computer mouse being part of the system operating the algorithm, the system is a computer including at least a processor and memory.

Thus, for example after a first action by a user the distance between two columns may be increased, while all other sizes of a table remain constant. Upon a further action by a user, for example the line heights are increased, while all other sizes of the table remain constant. After a further action by the user, a further increase of a distance between columns may take place while at the same time the line heights are reduced, preferably to the initial value, etc.

This is only an example. However, the algorithm applies to any decrease and/or increase of any distance or distances as well as line heights and column widths, wherein in each step only one quantity (such as distances or line heights etc.) may be changed or simultaneously two or more of these quantities. The above example shows that the steps which are performed subsequently do not only refer to increases but also to decreases or maintaining of distances/line heights/column widths.

In a preferred embodiment of the invention, the steps comprise increasing and decreasing or vice versa the distance and/or the line height and/or the column width, preferably by a certain predetermined quantity which provides optimum legibility of the table.

It is further conceivable that the parameters which reflect the amount of the changes are stored by the system and can be applied by a user or by the system to a new table.

Thus, an optimal set of parameters can be applied to any new table without any further effort by the user.

In a preferred embodiment the table is a so called "pivot-table", an example of which is disclosed in U.S. Pat. No. 8,442,936 B2.

In accordance with a further embodiment of the invention the changing means are adapted to maintain the distance between data located in columns and/or between data located in lines and/or the line height and/or the column width constant or even to decrease said distance, line height or column width while at the same time increasing or maintaining the distance between other data located in columns and/or between other data located in lines and/or the line height and/or the column width. In other words, the means for changing the distance may be adapted so as to change not all distances between columns and/or lines and/or line heights and/or column widths, but only one or some of them. Further the system may be operable to maintain the distance between columns and/or lines constant or even to decrease that distance while at the same time increasing the distance between other columns and/or lines. The same applies to line heights and/or column widths.

In case that there is no need for certain data to increase the distance to the next column or line of data such change of distance may not take place or even a reduction of the distance is possible. This provides space for an increase of the distance between other columns or lines of data which are of higher interest to the user and thus require a higher degree of legibility.

In accordance with a preferred embodiment the user of the system may decide which distances and/or line heights and/or column widths may be increased, decreased or remain constant.

Further it is conceivable, that the system automatically increases the distance between columns or lines of different first categories only or between columns or lines of different sub-categories only or between columns or lines of different first categories as well as sub-categories etc. In accordance with a preferred embodiment the system comprises adjustment means which allow a user to decide which categories are affected by a distance change and which are not. The same applies to line heights and/or column widths Furthermore, the changing means may be adapted so as to be adjustable in terms of the amount of the change. Thus the user can decide which amount of change is required. This amount may be the same or different of all kinds of categories, i.e. for all hierarchies of the table.

In accordance with a further embodiment the changing means are adapted so as to be adjustable in terms of the kind and/or number of categories which are affected by the change of the distance between data and/or line height and/or column width. As outlined above, it is for example conceivable that a change of the distance only applies for the first categories, only for one or more sub-categories etc.

The changing means may be adapted to change the distance between data related to the first categories and further—if more than first categories are affected—to change the distance between data related to sub-categories.

The changing means may be adapted to change the distance of data related to lines first if more hierarchies of lines exist than hierarchies of columns and—vice versa—to change the distance of data related to columns first if more hierarchies of columns exist than hierarchies of lines.

Further, the changing means may be adapted change the distance of data related to lines as well as the distance of data related to columns in an equal number if the number of hierarchies of lines is equal to the number of hierarchies of columns.

If for example the table has two hierarchies of lines (at least one first category and at least one sub-category) and three hierarchies of columns (at least one first category at least one first sub-category and at least one second sub-category) and the user decides that two hierarchies are affected by a change of the distance between the data, the system increases the distance between the data of first categories of the columns (because the columns have more hierarchies) and the remaining change (one change remaining) relates to columns as well as to lines. This means that according to the example the system further increases the distance between data of a sub-category of the columns as well as between data of a sub-category of the lines.

If, however, the table for example has two hierarchies of lines (at least one first category and at least one sub-category) and two hierarchies of columns (at least one first category and at least one sub-category) and the user decides that two hierarchies are affected by a change of the distance between the data, the system increases the distance between the data of first categories and the sub-categories of the columns as well as the distance between the data of first categories and the sub-categories of columns.

According to a further embodiment the system comprises adjustment means for automatically adjusting the distance between data and/or the line height and/or the column width depending of the kind of category, i.e. depending on the hierarchy. Accordingly, the distance change is performed automatically depending of the kind or category, such as 5 mm between first categories, 3 mm between first sub-categories and 1 mm between second sub-categories etc. It is conceivable that the system comprises adjustment means which allow the user to decide the magnitude of the change and/or which categories are affected by a change.

BRIEF DESCRIPTION OF THE DRAWINGS

The present invention will be described in further detail with reference to the accompanying drawings in which FIG. 2 illustrates modification of such table, FIG. 3 illustrates further modification of such table, FIG. 4 illustrates further modification compared to FIG. 2.

DESCRIPTION OF THE PREFERRED EMBODIMENTS

Further advantages of the invention are demonstrated in the embodiment according to FIGS. 1 to 5:

The table shown in FIG. 1 has first categories of the columns which are "sales group I" and "sales group II". Each of these two first categories are sub-divided into three first sub-categories "actual", "Δplan" and "\plan %". Each of these first sub-categories are sub-divided into two second sub-categories "not cum." and "cum.".

As regards the lines of the table there are four first categories "south", "north", "east" and "west". Each of these first categories are sub-divided into four first sub-categories "all products", "luxury products", "special products" and "standard products".

Thus, the data in the columns are divided into three dimensions (hierarchies) and the data in the lines are divided into two dimensions (hierarchies).

The values shown in the table reflect turnover numbers as well sparklines showing a development of the turnover over time.

As shown in FIG. 1 there are six columns of data related to each first category of the columns, two columns of data related to each first sub-category of the columns and one column of data related to each second sub-category of the columns. Further there are four lines of data related to each first category of the lines and one line related to each first sub-category of the lines.

In order to increase the legibility of the table the user may decide to increase the distance between two or more columns and/or between two or more lines of the table so that data neighboring each other become more spaced apart from each other.

A result of such change is shown in FIG. 2. In this figure the distance C1 between the set of data belonging to one first category of the columns ("sales group I") and the set of data belonging to another first category of the columns ("sales group II") has been increased. Furthermore the distances C2 between the sets of data belonging to the first sub-categories ("actual", "iplan" and "Aplan %") have been increased.

However, the distance C3 between the sets of data belonging to the second sub-category of the columns ("not cum." and "cum.") as well as the line height LH' remained unchanged as shown by a comparison with FIG. 1.

As regards the lines, the distance L1 between the sets of data belonging to the first category of the lines ("south", "north", "east", "west") has been increased. However, the distance L2 between the sets of data belonging to the first sub-category of the lines ("all products", "luxury products", "special products" and "standard products") remained unchanged as shown by a comparison with FIG. 1.

In the present example the user decided that number of the increases of distance should be two. Since the table has three dimensions (i.e. three kinds of categories) of the columns and two dimensions (i.e. two kinds of categories) of the lines, one change refers to the first category of the columns and the second change refers to the first sub-category of the columns as well as to the first category of the lines.

If the user would have decided that three changes should have been made, the change of the distance would have been valid for the second sub-category of the columns and further to the first sub-category of the lines as well.

In other words, if the dimensions, i.e. the number of hierarchies (=the number of kinds of categories) in the table is the same for the columns as well as for the lines in accordance with a preferred embodiment the number of changes are valid for both, the columns as well as for the lines. For example the distance between first categories and first sub-categories of the columns as well as between first categories and first sub-categories of the lines is increased.

If however, the dimensions of columns and lines are different, in accordance with a preferred embodiment the first (and further, if any) changes relate only to columns or lines, depending whether the columns or lines have more dimensions and the remaining changes relate to columns as well as to lines. If the table has for example 5 dimensions of the lines and 3 dimensions of the columns and the number of changes elected by the user is 3, the first and second change only relate to the lines (for example to the first category and the first sub-category) and the third change relates to the lines (for example to the second sub-category) as well as to the columns (for example to the first category). This may relate to the changes of distances and/or of line heights and/or of column widths.

Thus, the difference between the hierarchies of the columns and of the lines reflects the number of changes of the distance which are valid only for the lines or only for the columns, depending which hierarchy is higher. The remaining changes are valid for both, the lines and columns.

In a next step the line height LH' is changed, namely increased to the line height LH which becomes evident by a comparison between FIG. 2 and FIG. 3. In this step all other sizes, i.e. distances remained constant with relation to FIG. 2.

FIG. 4 shows the table of the embodiment in which the distances C1 and C2 are further increased compared to the table shown in FIG. 2 and further distance C3 is increased compared to the table shown in FIG. 1. Furthermore, the distance L1 is increased compared with the table shown in FIG. 1.

A further comparison between FIGS. 3 and 4 shows that in this step the line height LH has been decreased to the initial value LH' or to another value.

This decrease of the line height is acceptable because the legibility of the table is now sufficient for the user due to the increased distances between the lines and/or columns.

Such decrease may apply not only to the line height and/or column width but also to any distance in the table.

Figure 5:
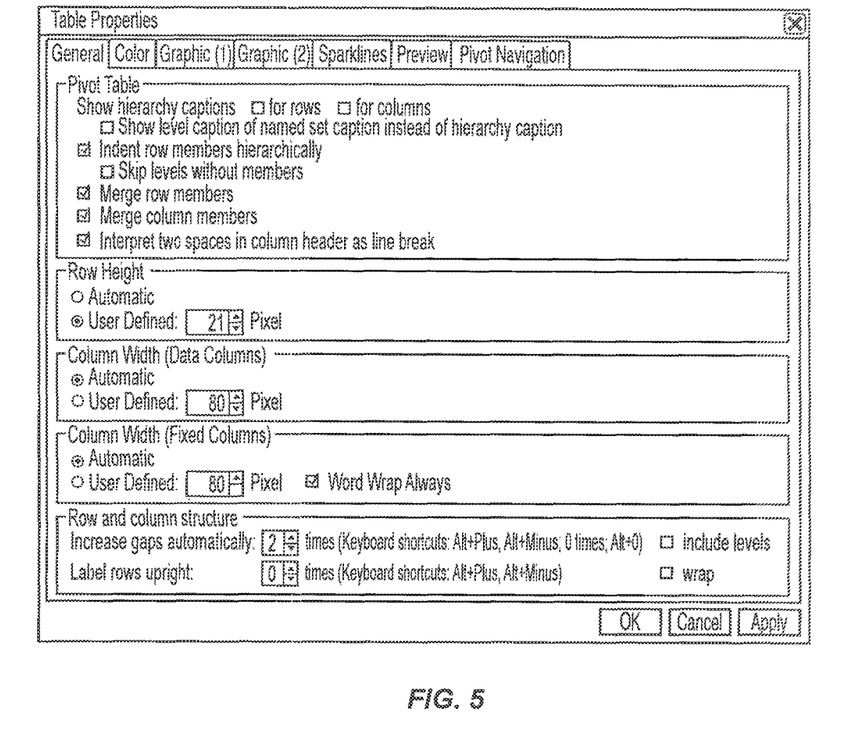
FIG. 5 illustrates a screenshot of a display of a system.

FIG. 5 shows an example of a screenshot of a display of a system in which the change of the line height and/or of the column width may be changed automatically or user defined. As shown in the line before last in FIG. 5 it is conceivable that the user defines how often the distances (gaps) may be increased upon action by the user. Such action by the user may be performed by any keyboard shortcuts etc.

In other-words, after each of such action by the user one or more changes take place in the table, as for example shown in FIGS. 1 to 4.

In the example shown in FIGS. 1 to 4 the user performed an action three times, such as pressing a key on the keyboard in order to come from the table shown in FIG. 1 to the final table shown in FIG. 4.

The distances and/or line heights and/or column widths and the changes thereof may be given automatically by the system.

It is conceivable that an optimal set of parameters which have been found for a particular table can be stored in a storage, i.e., memory, of the system and applied to a new table, in particular of the same kind.

It is conceivable that the system is adapted to change the distance depending on the hierarchy of the table, such as by value V1 between first categories, by a value V2 between first sub-categories etc. The values V1 and V2 may be the same or different. In accordance with a preferred embodiment those values may be set by a user of the system.

The invention claimed is:

1. A system for modifying a table, the system comprising:
   memory;
   a display; and
   one or more processors operatively coupled to the memory, wherein the one or more processors are configured to:
   provide a table containing one or more columns and one or more lines containing a plurality of data, the table having one or more column categories with one or more hierarchies of columns related to the one or more columns and having one or more line categories with one or more hierarchies of lines related to the one or more lines;
   output on the display the table;
   changing, at a first time, a distance between data related to neighboring first column categories of a first hierarchy of columns and maintain, at the first time, a distance between data related to neighboring first line categories of a first hierarchy of lines when a number of the hierarchies of columns is greater than a number of the hierarchies of lines; and output on the display the table with the changed distance,
wherein the system is adapted to increase and/or decrease said distance to increase legibility of the table.

2. The system according to claim 1, wherein the changing is adapted to increase and/or increase the distance between data located in columns and/or lines.

3. The system according to claim 2, wherein the system includes an algorithm, and the algorithm is adapted to change the distance and/or line height and/or column width, in subsequent steps.

4. The system according to claim 1, wherein the system includes an algorithm, and the algorithm is adapted to change the distance between the data related to neighboring first column categories of a first hierarchy of columns or the data related to neighboring first line categories of a first hierarchy of lines and/or the line height and/or column width, in subsequent steps.

5. The system according to claim 4, wherein the steps are performed automatically and/or upon action of a user.

6. The system according to claim 4, wherein the steps comprise increasing and decreasing or vice versa the distance and/or line height and/or column width.

7. The system according to claim 4, wherein
parameters reflecting the amount of the changes are stored and can be applied to a new table.

8. The system according to claim 1, wherein the changing is adapted to maintain the distance between data located in columns and/or lines and/or line height and/or column width constant or decrease said distance and/or line height and/or column width while at the same time increasing the distance between other data located in columns and/or lines and/or the line height and/or the column width.

9. The system according to claim 1, wherein the changing is adapted to be adjustable in terms of an amount of the change.

10. The system according to claim 1, wherein the changing is adapted to be adjustable in terms of a kind and/or number of categories which are affected by the change of the distance between data.

11. The system according to claim 1,
wherein the changing is adapted, at the first time, to: change the distance between the data related to the neighboring first column categories of the first hierarchy of columns when the number of the hierarchies of columns is greater than the number of the hierarchies of lines, and change the distance between the data related to the neighboring first line categories when the number of the hierarchies of columns is smaller than the number of the hierarchies of lines.

12. The system according to claim 1,
wherein the changing is adapted, at the first time, to change both of the distance between the data related to the neighboring first column categories of the first hierarchy of columns and the data related to the neighboring first line categories of the first hierarchy of lines when the number of the hierarchies of lines is equal to the number of the hierarchies of columns.

13. The system according to claim 1, wherein the system is configured to automatically adjust the distance between data and/or line height and/or the column width depending of a kind of category.

14. The system according to claim 1, wherein the system includes an algorithm, and the algorithm is adapted to change the distance and/or line height and/or column width, in subsequent steps.

15. The system according to claim 14, wherein the steps are performed automatically and/or upon action of a user.

16. The system of claim 1, wherein the one or more processors are further configured to: change, at a second time subsequent to the first time, a distance between data related to neighboring first sub-column categories of a second hierarchy of columns if at least one of the first column categories is affected by the change, at the first time, of distance, and after the change in distance the first sub-column categories are still directly adjacent to each other; and output on the display the table with the changed distance between the first column sub-categories, and wherein a distance between data contained in each first column category or first sub-column category is maintained.

17. A system for modifying a table, the system comprising:
memory;
a display; and
one or more processors operatively coupled to the memory, wherein the one or more processors are configured to:
generate a table, the table including first column categories, each first column category containing a plurality of data, first column sub-categories that are subset of the first column categories, and second column sub-categories that are a subset of the first column sub-categories, wherein the table includes columns and lines containing the data, the data in the columns and lines are associated with one or more of the first column categories being related to a first hierarchy, first column sub-categories being related to a second hierarchy, and the second column sub-categories being related to a third hierarchy, wherein the table including one or more lines categories with one or more hierarchies of lines related to the lines;
output on the display the table;
change, at a first time a distance between data related to neighboring first column categories of the first hierarchy of columns and maintain, at the first time, a distance between data related to neighboring first line categories of a first hierarchy of lines when a number of the hierarchies of column is greater than a number of the hierarchies of lines;
change, at a second time subsequent to the first time, a distance between data associated with neighboring first column sub-categories of the second hierarchy of columns,
wherein when the distance is changed between the data associated with the first column sub-categories, the data associated with a group of second column sub-categories associated with a same first column sub-category does not change, and the first column sub-categories that were subject to the changed distance remain directly adjacent to each other, and maintaining a distance between data contained in each category or sub-category; and
output on the display the table with the changed distance,
wherein the system is adapted to increase and/or decrease said distance to increase legibility of the table.

18. The system according to claim 17, wherein the system includes an algorithm, and the algorithm is adapted to change the distance and/or line height and/or column width, in subsequent steps.

19. A system for modifying a table, the system comprising:

memory;

a display; and one or more processors operatively coupled to the memory, wherein the one or more processors are configured to:

generate a table including columns and lines including a plurality of groups of data, each group of data includes data contained in adjacent columns and lines of the table, the table having one or more column categories with one or more hierarchies of columns related to the columns and having one or more line categories with one or more hierarchies of lines related to the lines;

output on the display the table;

change, at a first time, a distance between data related to neighboring first column categories of a first hierarchy of columns and maintain, at the first time, a distance between data related to neighboring first line categories of a first hierarchy of lines when a number of the hierarchies of columns is greater than a number of the hierarchies of lines;

maintain, at the first time, a distance between data related to neighboring first column sub-categories of a second hierarchy of columns; and output on the display the table with the changed distance, wherein the system is adapted to increase and/or decrease said distance to increase legibility of the table.

* * * * *